United States Patent Office 3,581,395
Patented June 1, 1971

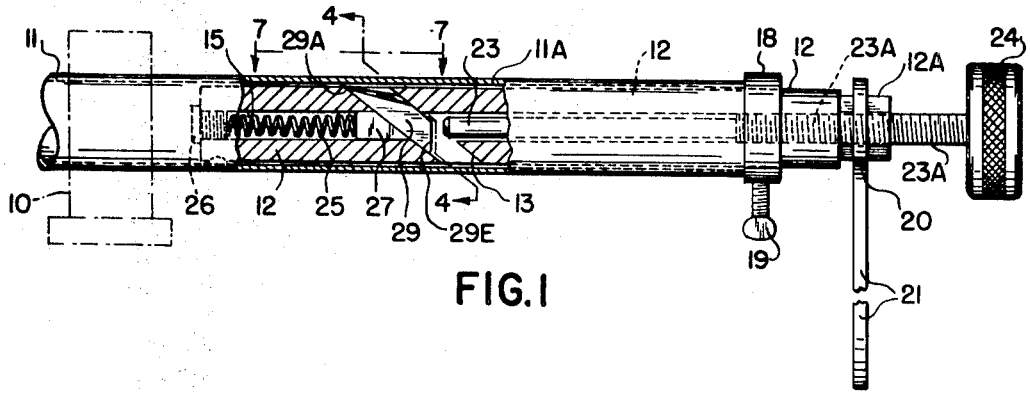

3,581,395
TOOL FOR INTERNALLY CUTTING A TUBE AT AN ANGLE TO THE AXIS THEREOF
Thomas B. McGuire, Elyria, and Andrew Pogan, North Ridgeville, Ohio, assignors of a fractional part interest to Bruce B. Krost
Continuation of application Ser. No. 375,217, June 15, 1964. This application June 4, 1970, Ser. No. 43,348
Int. Cl. B23d 21/06, 27/00
U.S. Cl. 30—107                                          7 Claims

ABSTRACT OF THE DISCLOSURE

A cutting tool for internally cutting a tube at a distance from an end thereof. The blade may be so arranged within said tube during the cutting operation that a beveled end is obtained.

---

Our invention relates to an improved cutter for cutting tubes, pipes and other tubular members.

This application is a continuation of our copending application Ser. No. 375,217 filed June 15, 1964.

The invention is directed to the cutting of a tube by the cutting tool extending at an acute angle to the tube axis at a desired location along the length of the tube and in such manner as to form the cut tube as desired. Among the features of the invention are the accomplishment of the following objects:

An object of our invention is to provide an improved cutter which so cuts a metal tube as to leave the remaining tube end substantially in the cylindrical form of the original tube.

Another object is to provide means for cutting a tube of metal or other cuttable material, which means is so constructed as to leave an end which is not flared or distorted from its original generally cylindrical form.

Another object is the provision of means for cutting a tube, as for example, a copper tube, which leaves a cut end already prepared and formed for readily fitting into a cylindrical socket, such as the socket of a fitting or coupling member.

Another object is the provision of an improved cutter which does not bend inwardly or form an annular rim or bead within the cylindrical form of the tube nor outwardly of the cylindrical form of the tube.

Another object is the provision of an improved tube cutter which cuts off a terminal piece of a tube in a manner so as not to flare outwardly nor to depress inwardly the end of the tube which remains after cutting off the terminal piece.

Another object is the provision of a cutting tool which while cutting off a terminal piece from a tube also chamfers the cut end of the remaining part of the tube so as to better prepare the cut end for ready insertion into a cylindrical socket.

Another object is the provision of improved means for internally cutting a tube at a distance from a free end thereof for the removal of a terminal piece of the tube and which leaves the cut end of the remaining tube in a condition for immediate assembly with a fitting, coupling or the like without additional treatment or processing of the cut end.

Another object is the provision of an improved cutting tool of the character described and which includes means for adapting the tool to tubes of various internal diameters.

Another object is the provision of an improved adapter for cutting tools.

Another object is the provision of improved means for obtaining new and important results in an efficient and economical manner.

Another object is the provision of means for overcoming the disadvantages, drawbacks and inherent deficiencies of prior tube cutting tools.

Other objects and a fuller understanding of the invention may be had by referring to the following description and claims, taken in conjunction with the accompanying drawing, in which:

FIG. 1 is an elevational view, partially in section, showing a preferred form of our cutting tool mounted in a tube to be cut;

FIG. 2 is an enlarged longitudinal sectional view of a portion of our tool positioned in a tube and showing an initial step in the cutting operation;

FIG. 3 is a view somewhat similar to that illustrated in FIG. 2 showing the final step of the cutting operation wherein the terminal piece of the tube has been entirely cut from the remainder of the tube;

FIG. 4 is an enlarged sectional view of our cutting tool taken through the line 4—4 of FIG. 1;

FIG. 5 is an enlarged sectional view of our cutting tool mounted in a tube of larger diameter than was the tube shown in FIGS. 2, 3 and 4 and illustrates an adapter mounted on the end of our cutting tool for adapting the tool to a tube of larger diameter;

FIG. 6 is a cross-sectional view taken through the line 6—6 of FIG. 5 and showing an adapter mounted on the end of the tool within the tube of larger diameter; and FIG. 7 is an enlarged sectional view looking into the tube in the direction of the arrows 7—7 of FIG. 1.

In prior practices of cutting tubes, as for example, copper tubing, one means has been by an external cutter wherein a circular cutting blade or disc was revolved around the exterior of the tube so that the edge of the cutting disc progressively cut the wall of the tube. However, at the same time, the tube wall was pressed or pinched inwardly so as to reduce the internal diameter of the tube at the cut end of the remaining piece. This required that another tool be used to open up the wall of the tube at the cut end and to try to restore it to proper cylindrical form before its assembly with a fitting, coupling or the like.

Another means of cutting tubing has been to transversely saw the end of the tube with a hack saw or the like. This, however, distorted and multilated the cut end of the remaining piece of the tube so that the cut end required further treatment and preparation before it could be assembled with other parts.

Another prior means has been by use of an internal cutter in which cutting discs or blades were inserted internally of the tube and then revolved therein radially outward against the internal wall of the tube so as to progressively cut the tube. These prior internal cuts, however, forced the edges of the cutting discs or points of the cutting blades radially outward in a plane normal to the axis of the tube. This outwardly forcing of the cutting edges or points of the cutters tended to bulge or outwardly distend the wall of the tube a longitudinal distance on each side of the plane of the cut made by the edge or point of the cutting blade or disc. This in effect formed an outwardly extending bead on the tube and after the cut was completed by the point or edge of the cutting blade going through the wall of the tube, there remained a flare or funnel shape on both sides of the cut, that is, on both the terminal piece that is cut off and thrown away and on the cut end of the remaining piece of the tube. This flare or funnel shape on the terminal piece usually thrown away did not matter very much and particularly if the terminal piece was discarded. However, the outward flared or funnel shape on the cut end of the remaining tube was disadvantageous and it required further treatment and manipulation of the tube so as to restore the cut end of the remaining tube to its original true cylindrical form.

As will be apparent to those versed with the problems, the disadvantages of the prior tools are overcome and cured by our new tool herein disclosed.

In the drawings, a tube such as a piece of copper tubing is denoted by the reference character 11. A terminal piece, denoted as 11A, at the free end thereof as shown in FIG. 1 is to be cut off at a determined distance from the free end of the tube. The tube may be held in a vise 10 or other holding means. For example, the tube 11 may be extended upwardly from a concrete mat or slab in which a tube generally is embedded. In the construction of a building, the tube 11 may be directed upwardly in the corner of a room and near the walls thereof and our cutting tool is particularly suited for use in such close quarters where there is not much space around the exterior of the tube at the location where it is to be cut and hence where an external cutter couldn't conveniently be used.

Our tool has a shaft or shank 12 of generally outward cylindrical form which is adapted to fit or be inserted into the tube 11 from the free end thereof. The outward end of the shaft 12 has a hexagonal or other non-circular end portion 12A at its outer end. A ratchet-socket member 20 fits on the hexagonal end 12A so as to non-rotatively engage therewith and a handle 21 secured to the ratchet-socket 20 extends radially outward therefrom. By revolving the handle 21 about the axis of the tool, the shaft 12 is rotated. By adjusting the ratchet-socket 20 so as to act as a ratchet in the well-known manner, then the handle 21 may be swung back and forth in an arc so as to obtain the desired rotative action to the shaft 12. The shaft 12, ratchet-socket 20 and handle 21 together provide operating means for revolving within the tube at a determinable distance from the free end thereof a cutter or cutting bit 29 carried by the shaft 12 adjacent its inner end within the tube 11.

To accommodate the cutting bit 29, there is provided in the shaft 12 a transverse oblique opening 13 extending through from one side of the shaft to the other. The opposite, forward and rearward walls of this opening 13 are in parallel planes disposed at an acute angle to the axis of the shaft 12. The walls of opening 13 engaged by bit 29 form guide bearing means for guiding movement of the bit. This acute angle is preferably of the order of 35° to 55°, next most preferably of the order of 40° to 50°, and most preferably of the order of about 45°.

Extending longitudinally through the shaft 12, there is a central longitudinal opening 14 and extending therefrom through the outer or free end of the shaft 12 is a rod 23. This rod 23 has a threaded portion 23A which is threadably engaged with the internally threaded wall of the opening 14 provided near the outer or free end of the shaft 12 so that rotation of the rod 23 relative to the shaft 12 causes longitudinal movement of the rod 23 relative to the shaft 12. In other words, the inner engagement of the rod 23 and shaft 12 is such as to provide for translating rotative movement of the rod 23 to longitudinal movement thereof. A knob 24 on the outer end of the rod 23 is provided for ready manual turning of the rod 23 at its outer or free end thereof.

At the inner or inserted end of the shaft 12, there is another longitudinal opening 15 which is provided for accommodating a coil spring 25 therein. One end of the spring 25 presses against a threaded end plug 26 which is threadably engaged to the shaft 12 at its inner or inserted end and which closes the opening 15. At the other end of the spring 25 at a longitudinal distance from the end plug 26 is a sliding block 27 which may slide longitudinally along the opening 15. The resilient bias of the spring 25 is such as to resiliently urge the sliding block 27 toward the free end of the shaft 12, that is, toward the right in FIG. 1. The end of the block farthest removed from the end plug 26 is inclined at an acute angle to the axis of the shaft 12, which acute angle preferably corresponds to the acute angle of the opposite walls of the transverse opening 13. For example, in FIG. 1, the opposite forward and rearward faces of the opening 13 are at about 45 degrees to the axis of the shaft and also the corresponding end face of the sliding block 27 is at about 45 degrees to the same axis. The angular end face of the sliding block 27 abuts the opposed side of the cutting bit 29 and by reason of the angularity of the parts and their cooperative position, the sliding block 27 under the resilient urging of the spring 25 cammingly urges or presses the cutting bit 29 in one direction, that is, toward the right and downwardly in the view of FIG. 1.

To provide for adjusting the extent to which the shaft 12 may be inserted into the tube and hence to help fix the location of the cut to be made relative to the free end of the tube, there is provided an adjusting collar 18 which fits on the exterior of the shaft 12 near its outer or free end. By a thumb screw 19 threadably engaged to the collar 18 and extending radially therethrough so as to engage the side of the shaft 12, the position of the collar 18 may be adjustably varied along the shaft 12. The side of the collar 18 abuts and slidably engages the free end of the tube 11. As will be readily apparent, the distance of the cut to be made from the free end of the tube may be quickly determined.

The cutting bit 29 is provided with a cutting point 29A which progressively penetrates and cuts the wall of the tube. Extending toward the point 29A there is an oblique forward edge 29B which buttresses and supports the point 29A as better seen in FIG. 4 the direction of movement of the cutting bit 29 during the cutting operation is such that the cutting point 29A moves in a clockwise direction. On the same side of the cutting bit as the point 29A is an upper longitudinal edge 29C which extends in a slope from the point 29A radially inward of the shaft and toward the outer or free end thereof. On the opposite side of the cutting bit there is a lower longitudinal edge 29D which extends radially inward at a sharper angle then does upper longitudinal edge 29C, these edges being better seen in FIGS. 2, 3 and 7.

Disposed transversely of the cutting bit 29 at about a 45-degree angle to its longitudinal axis and hence substantially normal to the axis of the shaft 12, there is a rearward flat face 29E. This flat face 29E of the cutting bit 29 is disposed to be abutted by the inner end of the rod 23 within the central opening 14. Axial movement of the rod 23 relative to the shaft 12 in a direction away from the outer free end of the shaft, that is, toward the cutting bit 29, causes the end of the rod 23 to press against the flat face 29E and hence to cammingly urge the cutting bit outwardly in sliding engagement with the opposed walls of the transverse opening 13. The movement of the cutting bit 29 under the urging of the rod 23 is such as to urge the cutting point 29A both radially outward of the shaft 12 and also axially away from the outer or free end of the shaft 12 and the free end of the tube 11.

It is to be noted that one side of the cutting bit 29 has a forwardly inclined face 29F which corresponds with the next adjacent similarly inclined wall of the opening 13. This forwardly inclined face 29F is preferably at the same inclined angle as is the axis of the opening 13. In other words, it is preferred that the inclined face 29F and its interengaged wall of the opening 13 are at an inclined angle relative to the axis of the shaft 12, which inclined angle is preferably of the order of 35° to 55°, next preferably of the order of 40° to 50° and most preferably of the order of 45°. The described inclination and cooperation of the cutting bit 29 guided by the opposing walls of the opening 13 is such as to obtain a camming, sliding action whereby the cutting point 29A moves outwardly both radially and axially at the described angle as the rod 23 is moved axially against the cutting bit 29.

In FIG. 1, the cutting bit 29 is shown in its retracted position, that is, wholly within the confines of the shaft 12 and with the rod 23 moved away from the cutting bit 29.

The cutting bit 29 is held in this retracted position by the resilient urging of the block 27. A subsequent step is illustrated in FIG. 2 wherein the rod 23 has pushed the cutting bit 29 outwardly both radially and axially so as to cause the cutting point 29A to press against the inner wall of the tube 11 and by revolving the cutting point 29A through the rotation of the shaft 12 with the handle 21, the point 29A has partially cut into the tube wall to form an internal annular groove. At the same time, it is to be noted that the tube 11 has begun to form a bulged portion 11B adjacent to the internally cut groove but on the side of the groove which is toward the free end of the tube.

A subsequent step is illustrated in FIG. 3 wherein the cutting bit 29 has been moved outwardly of the shaft 12 a greater amount and the shaft 12 has been continued to be rotated so as to revolve the cutting point 29A in a clockwise direction so that the cut has been completed and the point 29A is exposed outwardly of the tube . It is now noted that the bulged portion 11B constitutes a flare or funnel shape on the terminal piece 11A which may be discarded or thrown away. However, the cut end of the remaining tube 11 has not been flared outwardly as all of the bulging or flaring has been on the terminal piece cut off the tube. It is also to be noted that the cutting bit during the cutting operation has progressively over-ridden the cut edge of the end of the remaining tube 11 so as to confine and prevent the tube being flared outwardly during the cutting operation. In progressively over-riding the cut end of the remaining tube 11, the said cut end has been chamfered to form the chamfered cut end 11C of the remaining part of the tube. The direction of the cut has been so that the opposed cut edges which remain are at an incline to the axis of the tube as illustrated in FIG. 3. It is to be noted in FIG. 3 that the internal diameter of the remainder of the tube 11 remains the same and in true cylindrical form. The remainder of the tube has not been flared outwardly and the opposite walls thereof are in the initial cylindrical shape of the tube except for the chamfered cut end 11C which is at about a 45-degree angle to the axis of the tube.

It is to be noted that although the terminal piece 11A which has been cut off from the tube 11 near its free end now may be discarded or thrown away, the cut end of the remainder of the tube is now in condition for immediate assembly with a fitting, coupling or other member. The cut end is not only straight and unflared but it is chamfered as shown and described so as to readily and easily fit into the cylindrical socket of a fitting, coupling or the like.

The tool illustrated in FIGS. 1, 2, 3 and 4 is adapted for a tube which complementarily accommodates the shaft 12. In those instances where it is desired to use the same tool to cut off a tube of larger diameter, adapters may be provided to engage the shaft of the cutting tool, which adapters are dimensioned so as to fit within tubes of various internal diameters. By way of example, FIGS. 5 and 6 illustrate an adapter which may be mounted on the same shaft 12 near its inner or inserted end and which adapter is sized to fit within a tube of larger diameter.

The shaft 12 is provided with oppositely disposed longitudinally extending grooves 16 which run therealong from the inner or inserted end of the shaft 12. An adapter 30 having internal key portions 30A may be slid longitudinally on to the shaft 12 from its inner end which is to be inserted into the tube. The key portions 30A are disposed within the opposite internal groove 16 so as to prevent rotation of the adapter 30 relative to the shaft 12. A ball detent 31 carried by the adapter 30 is spring-biased against the shaft 12 by a coil spring 32 in the well-known manner, the ball detent 31 being resiliently urged into a recess or dwell 17 provided in the side of the shaft 12 near the end thereof. The spring 32 and the ball detent 31 are accommodated in a cylindrical opening or recess 30B in the adapter 30. By means of the spring-detent arrangement, the adapter 30 may be readily mounted or demounted on the end of the shaft 12 which is to be inserted within the tube. The adapter 30 on the shaft 12 revolves with the shaft.

It is to be noted that the adapter in cross-section is of crescent shape so as to expose the side of the shaft 12 from which the cutting point 29A of the cutting bit 29 protrudes outwardly from the shaft. The adapter 30 with the shaft 12 upon which it is mounted together comprise a cylindrical form which is of greater diameter than that of the shaft 12 alone. By having a plurality of adapters of different sizes which may be readily mounted and demounted from the shaft, different sized tubes may be readily accommodated and cut with the same cutting tool.

It is to be noted that on rotation of the shaft 12 by means of the handle 21, upon an adapter being mounted on the inserted end of the shaft 12, the axis of the shaft is not coincidental with the axis of the tube and hence the axis of the shaft 12 revolves in an orbital path within the tube 11 as the shaft is rotated by the handle 21. However, the cutting action obtained by the revolving point 29A of the cutter is substantially the same when an adapter is used on the shaft as when the cutting tool is used without an adapter.

It may be observed that instead of using a spring-biased arrangement for retaining the cutting bit 29 within the shaft, such as by the spring 25 and sliding block 27, we may have the cutting bit 29 magnetized so as to yieldably urge the cutting bit 29 to remain within the opening 13. It is preferable that some means be provided to keep the cutting bit 29 from falling out of the opening 13 when the tool is removed or separated from a tube and thus to limit the possibility of loss of the cutting bit from the tool. A magnetic cooperation between the cutting bit and the shaft will aid in preventing the accidental removal of the cutting bit from the shaft.

We have provided a unique tool which is particularly adapted for the purpose of cutting tubes of metal and other cuttable material so as to leave a properly prepared end shaped cutting end on the tube which remains after cutting off a terminal piece. The disadvantages and difficulties of the prior devices are accordingly obviated and minimized.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What we claim is:

1. A tube-cutting tool comprising the combination of a shaft having a first end adapted to be inserted into the open end of a tube to cut off a terminal piece of the tube at a location spaced from said open end, operating means engaging said shaft adjacent its opposite end for rotating the shaft from outwardly of the open end of a said tube, a cutting bit having a cutting point at an outer end thereof and located on the bit farthest removed from said opposite end of the shaft, guide bearing means carried by said shaft for slidably holding said bit, said guide bearing means being disposed relative to said shaft to guide bit in said sliding movement along a straight path disposed at an angle to the axis of said shaft, said bit being positioned by said guide bearing means to point radially outward and away from said opposite end to include an acute angle between the axis of said shaft and said straight path, bit-actuating means carried by said shaft extending along and movable relative to said shaft, said bit-actuating means engaging said cutting bit to move it along said straight path outwardly from a withdrawn position to force the said cutting point directed at said acute angle into the wall of a tube disposed therearound, said bit having an over-all length not substantially exceeding the distance through said shaft along said straight path to permit the shaft and the bit carried thereby in withdrawn position to be readily inserted into said tube to cutting position within the tube, the angular disposition of said cutting bit along said path and the revolving of the cutting point upon the rotation of the shaft by said operating means causing said cutting point progressively to cut said tube wall at an incline to the axis of the tube and progressively to over-ride the cut edge of the tube wall in the cutting operation, whereby the cut edge of the terminal piece of the tube being cut off is flared radially outward by the cutting bit and the cut edge of the remaining tube is chamfered by the over-riding cutting point and maintained against flaring outwardly.

2. A tube-cutting tool adapted to cut off a terminal piece of a tube from within the tube at a distance from the open free end of the tube, said tool comprising in combination shaft means having a first end portion adapted to be inserted into the tube from said free end and rotatable from an opposite end portion, movable cutting means carried by the shaft for cutting said tube within the same at the extreme forward outer end of the cutting means upon rotation of said shaft means within the tube, guide wall means carried by said shaft means holding said cutting means for guiding movement of said cutting means relative to the axis of the shaft means along a path disposed at an acute angle to the axis of the shaft means, said angular path being inclined to direct said cutting means both radially outward and axially of the shaft means, actuating means carried by the shaft means for moving said cutting means relative to the shaft means along said angular path from a withdrawn position to protrude from the shaft means at said acute angle toward the wall of a tube therearound and progressively move at said acute angle into cutting engagement therewith, said cutting means having such size relative to the size of the shaft means as to permit the cutting means in withdrawn position to be substantially accommodated in the shaft means for ready insertion of the cutting means wholly inwardly of the tube to cutting position at said distance from the free end thereof, operating means engageable with said opposite end portion for rotating said shaft means and said cutting means protruding therefrom in a said tube and relative to the tube wall, whereby the extreme forward outer end of said cutting means protruding at said angle and rotated with said shaft means is directed to cut said tube wall at the angle of said angular path and progressively cutting said tube wall at the angle of said angular path and progressively cutting said tube wall to over-ride and chamfer the cut edge of one tube on the side of the cutting means.

3. A cutting tool for cutting off a terminal piece of a tube from within the tube at a location spaced from the open free end of the tube to leave a remainder of the tube substantially free of flaring at the cut edge thereof, said tool comprising in combination a shaft having a first end insertable in a said tube from the free end thereof and a second end accessible from the free end of the tube for rotating the shaft in the tube, operating means engaging said shaft adjacent said second end for rotating the shaft while disposed within and longitudinally of the tube, said shaft having an opening formed therein extending transversely thereof and having opposed walls inclined at an acute angle to the axis of the shaft, a cutting bit slidably disposed in said opening and guided by the inclined walls of said opening, said cutting bit having a cutting edge at one end thereof and an abutting portion spaced longitudinally of the cutting bit from said cutting portion, said cutting bit having a forwardly inclined surface on a side thereof extending to said cutting edge, said cutting bit being disposed in said opening to direct said cutting edge radially outward of said shaft and in an axial direction away from said second end of the shaft, and an actuating member carried by and extending along said shaft having an end portion positioned to engage said abutting portion of the cutting bit to push said cutting bit radially outward of said shaft in said opening movement of the actuating member in one direction relative to said shaft, the said cutting edge protruding outwardly of the shaft upon said cutting bit being pushed radially outward by the actuating member, said forwardly inclined surface of the cutting bit being disposed to extend from the said cutting edge at an incline radially inward and toward said second end of the shaft, said actuating member being interengageable with said shaft and movable relative thereto for adjusting the axial position of the actuating member relative to the shaft and hence the degree that the cutting bit is pushed radially outward by the actuating member, the cutting bit being revolvable with said shaft in said tube by the rotation of, the arrangement of the bit and shaft being that upon the shaft and the cutting edge of the bit being pushed outwardly against the tube wall and being revolved against the same and said tube wall and said forwardly inclined surface of the cutting bit over-rides the cut edge of the remainder of the tube during the cutting operation to restrain the same against outward flaring.

4. A cutting tool as defined in claim 3 and including gauging means carried by said shaft and extending outwardly therefrom for engaging the free end of the tube in which the shaft is inserted and being adjustably engageable to the shaft at variable locations therealong for adjustably limiting the distance that the cutting edge of said cutting bit carried by the shaft may be inserted into the tube.

5. A tool for cutting a terminal piece off a metal tube from the free end of the tube by cutting from within the tube at a location spaced from the said free end, comprising in combination a shaft adapted to have a first end portion insertable in a said tube from the free end thereof and to have a second end portion located to be accessible from said free end for rotation of the shaft relative to the tube wall, said shaft having a transverse opening disposed therein adjacent said first end portion and extending to the side of the shaft, a cutting bit disposed in said opening and movably slidable therein to protrude varying degrees from the side of the shaft, said cutting bit in withdrawn position being wholly accommodated in said opening to permit the cutting bit carried by said shaft to be fully inserted into a tube for cutting of the tube at said location spaced from the free end thereof, said cutting bit being revolvable by the rotation of said shaft, actuating means carried, by the shaft operatively engaging the cutting bit to slide the cutting bit outwardly in said opening and to urge the same to protrude outwardly of the shaft toward and against the wall of a tube in which the first end portion of the shaft is inserted, said cutting bit having a cutting edge at its outer end adapted to cut into the said tube wall upon being urged thereagainst and upon being revolved relative thereto by the rotation of said shaft, said cutting bit on a side thereof directed away from said second end portion of the shaft extending from said cutting edge thereof radially inward and angularly inclined toward said second end portion of the shaft, said side of the cutting bit being disposed to progressively ride up on the cut end of the remainder of the tube wall as a said terminal piece is cut therefrom by the said cutting edge to confine, radially inward of said side of the cutting bit, the said tube wall at said cut end against outward flaring by the cutting bit, and spring-biased retaining means carried by the shaft urged against the cutting bit for yieldably retaining the cutting bit against inadvertent sliding outwardly from said opening, and depth-adjusting means carried by the shaft for adjustably limiting the distance from the free end of the tube that the shaft and the cutting bit carried thereby may be inserted into a tube from said free end.

6. A tube-cutting tool comprising the combination of a shaft having a first end adapted to be inserted into the open end of a tube to cut off a terminal piece of the tube at a location spaced from said open end, operating means engaging said shaft adjacent its opposite end for rotating the shaft from outwardly of the open end of a said tube, a cutting bit having a cutting point at an outer end thereof and located on the bit farthest removed from said opposite end of the shaft, guide bearing means carried by said shaft for slidably holding said bit, said guide bearing means being disposed relative to said shaft to guide said bit in sliding engagement along a sloping path extending both radially outwardly from the shaft axis and longitudinally of the shaft in a direction away from said opposite end of the shaft, said bit being positioned by said guide bearing means to point radially outward and away from said opposite end to include an acute angle between said axis of said shaft and said sloping path, bit-actuating means carried by said shaft extending along and movable relative to said shaft, said bit-actuating means engaging said cutting bit to move it along said sloping path outwardly from a withdrawn position to force the said cutting point directed along said sloping path into the wall of a tube disposed therearound, said bit having an over-all length not substantially exceeding the distance through said shaft along said sloping path to permit the shaft and the bit carried thereby in withdrawn position to be readily inserted into said tube to cutting position within the tube, the disposition of said cutting bit along said sloping path and the revolving of the cutting point upon the rotation of the shaft by said operating means causing said cutting point progressively to cut said tube wall at an incline to the axis of the tube and progressively to over-ride the cut edge of the tube wall in the cutting operation, whereby the cut edge of the terminal piece of the tube being cut off is flared radially outward by the cutting bit and the cut edge of the remaining tube is chamfered by the over-riding cutting point and maintained against flaring outwardly.

7. A tool for cutting a terminal piece off a metal tube from the free end of the tube by cutting from within the tube at a location spaced from the said free end, comprising in combination a shaft adapted to have a first end portion insertable in a said tube from the free end thereof and to have a second end portion located to be accessible from said free end for rotation of the shaft relative to the tube wall, said shaft having an opening disposed therein adjacent said first end portion and extending to the side of the shaft, a cutting bit disposed in said opening and movably slidable therein to protrude varying degrees from the side of the shaft, said cutting bit in withdrawn position being wholly accommodated in said opening to permit the cutting bit carried by said shaft to be fully inserted into a tube for cutting of the tube at said location spaced from the free end thereof, said cutting bit being revolvable by the rotation of said shaft, actuating means carried by the shaft operatively engaging the cutting bit to slide the cutting bit outwardly in said opening and to urge the same to protrude outwardly of the shaft toward and against the wall of a tube in which the first end portion of the shaft is inserted, said cutting bit having a cutting edge at its outer end adapted to cut into the said tube wall upon being urged thereagainst and upon being revolved relative thereto by the rotation of said shaft, said cutting bit on a side thereof directed away from said second end portion of the shaft extending from said cutting edge thereof radially inward and inclined toward said second end portion of the shaft, said side of the cutting bit being disposed to progressively ride up on the end of the remainder of the tube wall as a said terminal piece is cut therefrom by the said cutting edge to confine, radially inward of said side of the cutting bit, the said tube wall at said cut end against outward flaring by the cutting bit, and retaining means carried by the shaft for retaining the bit to said shaft, and depth-adjusting means carried by the shaft for adjustably limiting the distance from the free end of the tube that the shaft and the cutting bit carried thereby may be inserted into a tube from said free end.

References Cited

UNITED STATES PATENTS

| | | | |
|---|---|---|---|
| 70,652 | 11/1867 | Thomas | 30—107 |
| 386,777 | 4/1888 | Vance | 30—105 |
| 441,479 | 11/1890 | Fry et al. | 30—107 |
| 672,312 | 4/1901 | Cook | 30—106 |
| 869,628 | 10/1907 | Fleming | 30—105 |
| 996,385 | 6/1911 | Wilkins | 30—108 |
| 1,413,522 | 4/1922 | Denning | 166—55 |
| 1,448,877 | 3/1923 | Smith | 30—94 |
| 1,653,186 | 12/1927 | Lance | 30—106 |
| 2,271,582 | 2/1942 | Dixon | 30—97 |
| 2,495,509 | 1/1950 | Cressex | 166—55 |
| 2,638,667 | 5/1953 | Anderson | 30—107 |
| 2,640,537 | 6/1953 | Edwards | 166—58 |
| 2,322,695 | 6/1943 | Kinzbach | 166—55 |

OTHELL M. SIMPSON, Primary Examiner